United States Patent
Hardy et al.

(10) Patent No.: US 10,255,092 B2
(45) Date of Patent: Apr. 9, 2019

(54) MANAGED VIRTUAL MACHINE DEPLOYMENT

(71) Applicant: AirWatch LLC, Atlanta, GA (US)

(72) Inventors: Adam Michael Hardy, Alpharetta, GA (US); Adam Stephen Rykowski, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 155 days.

(21) Appl. No.: 15/019,193

(22) Filed: Feb. 9, 2016

(65) Prior Publication Data

US 2017/0228245 A1    Aug. 10, 2017

(51) Int. Cl.
    G06F 9/455    (2018.01)

(52) U.S. Cl.
    CPC ............. *G06F 9/45558* (2013.01); *G06F 2009/45562* (2013.01)

(58) Field of Classification Search
    CPC .................................................. G06F 9/45533
    USPC .............................................................. 718/1
    See application file for complete search history.

(56) References Cited

U.S. PATENT DOCUMENTS

| | | | | |
|---|---|---|---|---|
| 7,996,785 B2* | 8/2011 | Neil | ........................ | G06F 9/455 715/778 |
| 8,549,513 B2* | 10/2013 | Vinberg | .................... | G06F 8/61 717/174 |
| 8,886,865 B1 | 11/2014 | Huang et al. | | |
| 9,286,102 B1* | 3/2016 | Harel | .................. | G06F 9/45558 |
| 2004/0203690 A1* | 10/2004 | Sprigg | ................. | G06F 9/44526 455/419 |
| 2006/0010433 A1* | 1/2006 | Neil | ..................... | G06F 9/45533 717/138 |
| 2006/0025985 A1* | 2/2006 | Vinberg | .................... | G06F 8/65 703/22 |
| 2007/0006218 A1* | 1/2007 | Vinberg | .................... | G06F 8/61 717/174 |
| 2008/0184216 A1* | 7/2008 | Muedsam | ................. | G06F 8/60 717/168 |
| 2009/0077551 A1* | 3/2009 | Whiteley | ............ | G06F 9/45558 718/1 |
| 2009/0313620 A1* | 12/2009 | Sedukhin | .................. | G06F 8/61 718/1 |
| 2010/0138829 A1* | 6/2010 | Hanquez | ............. | G06F 9/45533 718/1 |

(Continued)

OTHER PUBLICATIONS

International Search Report dated May 19, 2017 for Application No. PCT/US2017/017207.

*Primary Examiner* — Mehran Kamran
(74) *Attorney, Agent, or Firm* — Thomas Horstemeyer, LLP

(57) ABSTRACT

A system can include computer instructions that can cause a computing device to obtain a request to access an application on behalf of a user. The request can be obtained from a client device associated with the user. The computer instructions can further cause the computing device to determine whether the client device is required to execute a virtual machine that executes the application. The computer instructions can further cause the computing device to identify whether the virtual machine is installed in the client device. The computer instructions can further cause the computing device to cause the virtual machine to be installed in the client device.

20 Claims, 16 Drawing Sheets

(56) References Cited

U.S. PATENT DOCUMENTS

| | | | |
|---|---|---|---|
| 2010/0174894 A1* | 7/2010 | Chen | G06F 9/4416 713/2 |
| 2010/0306759 A1* | 12/2010 | Kohler | G06F 9/4484 717/174 |
| 2011/0271279 A1* | 11/2011 | Pate | G06F 21/53 718/1 |
| 2012/0042036 A1* | 2/2012 | Lau | G06F 8/61 709/217 |
| 2012/0110154 A1* | 5/2012 | Adlung | G06F 9/5077 709/223 |
| 2012/0110164 A1* | 5/2012 | Frey | G06F 9/5077 709/224 |
| 2012/0311575 A1* | 12/2012 | Song | G06F 9/45558 718/1 |
| 2013/0130652 A1* | 5/2013 | Deasy | H04W 76/10 455/411 |
| 2013/0132953 A1* | 5/2013 | Chuang | G06F 8/61 718/1 |
| 2013/0290954 A1* | 10/2013 | Dorland | G06F 9/45558 718/1 |
| 2013/0347064 A1* | 12/2013 | Aissi | G06F 21/30 726/2 |
| 2014/0007230 A1* | 1/2014 | Jani | G06F 21/00 726/22 |
| 2014/0040979 A1* | 2/2014 | Barton | H04L 63/20 726/1 |
| 2014/0089658 A1* | 3/2014 | Raghuram | H04L 9/0825 713/155 |
| 2014/0173589 A1* | 6/2014 | Babol | G06F 8/61 717/174 |
| 2014/0208316 A1* | 7/2014 | Ciano | G06F 9/4856 718/1 |
| 2014/0337528 A1* | 11/2014 | Barton | H04L 41/00 709/225 |
| 2015/0154039 A1* | 6/2015 | Zada | G06F 9/5011 718/1 |
| 2015/0301850 A1* | 10/2015 | Jeong | G06F 8/63 718/1 |
| 2015/0347194 A1* | 12/2015 | Che | G06F 9/5077 718/1 |
| 2015/0378763 A1* | 12/2015 | Hassine | G06F 9/45558 718/1 |
| 2016/0011818 A1* | 1/2016 | Hashimoto | G11C 16/3495 711/103 |
| 2016/0036963 A1* | 2/2016 | Lee | G06F 8/61 455/418 |
| 2016/0080474 A1* | 3/2016 | Argenti | H04L 67/10 709/201 |
| 2016/0085765 A1* | 3/2016 | Verma | G06F 17/30115 707/827 |
| 2016/0154665 A1* | 6/2016 | Iikura | H04L 43/0817 718/1 |
| 2016/0246583 A1* | 8/2016 | Kolesnik | G06F 8/61 |
| 2016/0342403 A1* | 11/2016 | Zamir | G06F 8/61 |
| 2016/0378462 A1* | 12/2016 | Hu | H04L 67/34 717/173 |
| 2017/0052803 A1* | 2/2017 | Purushothaman | G06F 9/44521 |
| 2017/0228245 A1* | 8/2017 | Hardy | G06F 9/45558 |

\* cited by examiner

MANAGED VIRTUAL MACHINE DEPLOYMENT

BACKGROUND

In an enterprise setting, users are often assigned a computing device. Some enterprises allow users to use their personal devices to access enterprise data and applications. The enterprises can determine which data or applications are available to respective users based upon a user's role or membership in a group within an enterprise.

Some enterprises can make applications browser based, so that users can execute and interact with particular applications through a web browser. In these scenarios, the enterprise can prevent a user from accessing the browser-based applications until the enterprise has authenticated the user based on a username and password.

Enterprises can also provide access to private or public application repositories that can make applications available through download. Users can download installation packages for the applications from the repositories, install the applications, and then execute the applications on their devices. To permit a user to download an installation package from a repository, an enterprise can require the user to enroll a device through an enterprise mobility management (EMM) system. An EMM system can enforce compliance rules and policies that ensure that certain information and data security requirements are being satisfied by the user's device. Because various types of prerequisites can exist in order to access enterprise applications, a user may not wish to enroll a device as managed device unless the user is accessing an application that requires enrollment with an EMM system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the deployment and configuration of virtual machines on client devices that can be managed by an enterprise management service. In one example, a user may wish to use an application that cannot be executed natively by the host operating system installed in the user's client device. To provide the user with access to the application despite the host operating system being unable to execute the application, a management service that monitors and controls the user's client device can create and provide the client device with a virtual machine that can emulate execution of the application requested by the user. In addition, the management service can install other components, such as a hypervisor and guest management component, that can be required to execute and monitor activity of the application. Furthermore, the management service can cause the virtual machine to execute in a mode in which a console for the virtual machine is hidden while a hypervisor generates user interfaces for the executed application so that the application appears to be executing natively by the host operating system. Thus, the user can have access to an application that is not executable by the host operating system, and the application can appear to the user as if the application is installed and being executed by the host operating system in the user's device.

In the following discussion, examples of systems and their components are described, followed by examples of the operation of those systems.

Figure 1:
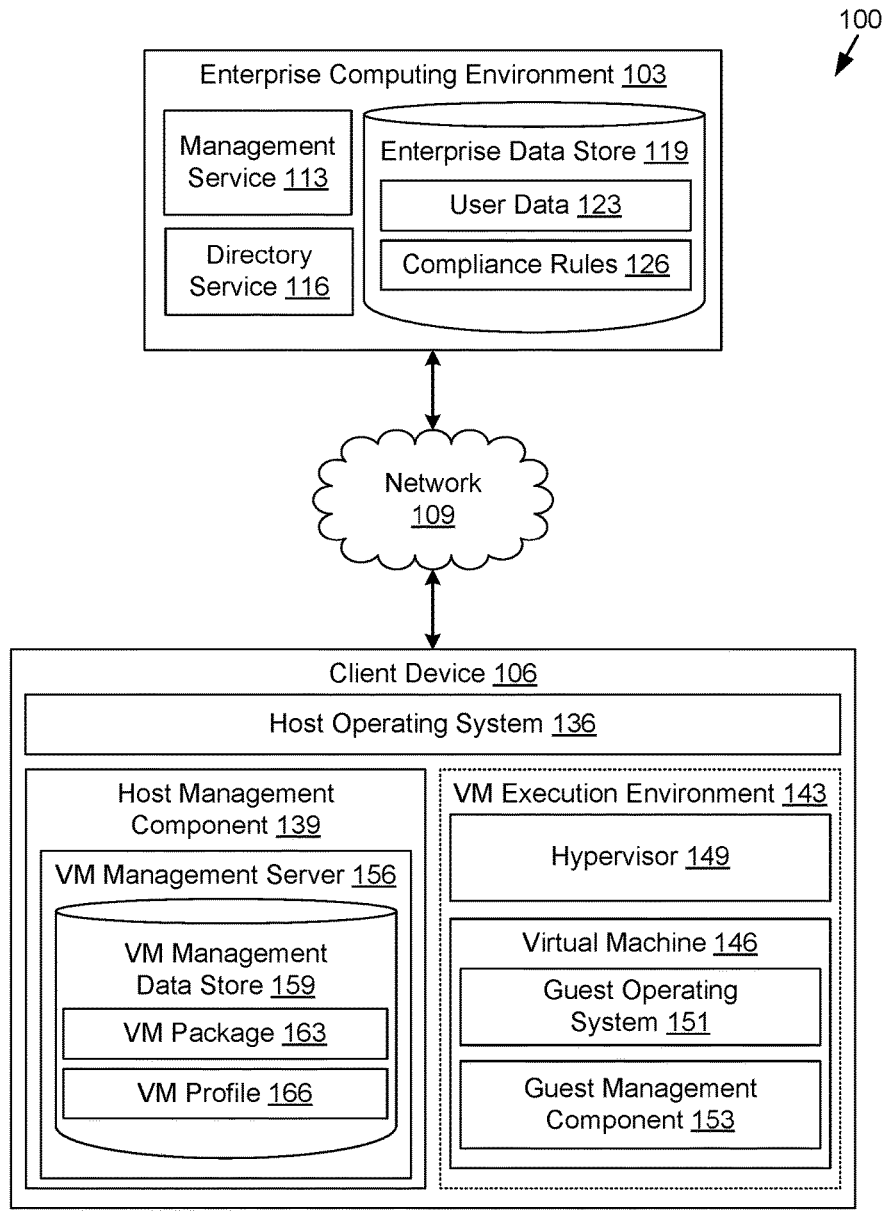
FIG. 1 is a drawing of an example of a networked environment.

With reference to FIG. 1, shown is an example of a networked environment 100. The networked environment 100 can include an enterprise computing environment 103 and a client device 106 in data communication through a network 109. The network 109 can include the Internet, one or more intranets, extranets, wide area networks (WANs), local area networks (LANs), wired networks, wireless networks, or any combination of two or more such networks. The network 109 can include satellite networks, cable networks, Ethernet networks, cellular networks, and telephony networks.

The enterprise computing environment 103 can be a computing system operated by one or more enterprises, such as a business or other organization. The enterprise computing environment 103 can include a computing device, such as a server computer, that can provide computing capabilities. Alternatively, the enterprise computing environment 103 can include multiple computing devices arranged in one or more server banks or computer banks. For examples in which the enterprise computing environment 103 includes multiple computing devices, the computing devices can be located in a single installation, or the computing devices can be distributed among multiple different geographical locations.

In some examples, the enterprise computing environment 103 can include computing devices that together form a hosted computing resource or a grid computing resource. In other examples, the enterprise computing environment 103 can operate as an elastic computing resource for which the allotted capacity of computing-related resources, such as processing resources, network resources, and storage resources, can vary over time. In other examples, the enterprise computing environment 103 can include or be operated as one or more virtualized computer instances that can be executed in order to perform the functionality that is described herein.

The enterprise computing environment 103 can include various systems. For example, the enterprise computing environment 103 can include a management service 113 that can monitor and manage the operation of client devices 106 associated with the enterprise that operates the enterprise computing environment 103. In some examples, the management service 113 can manage and oversee the operation of multiple client devices 106 enrolled in a mobile device management service that is provided by the management service 113. The management service 113 can also provide the client devices 106 with access to email, calendar data, contact information, and other resources associated with the enterprise.

The enterprise computing environment 103 can also include a directory service 116. The directory service 116 can authenticate users and determine which particular enterprise resources a user is entitled to access. The directory service 116 can also manage the credentials, such as user names and passwords, of users that have access to resources of the enterprise computing environment 103. In some examples, the directory service 116 can include a MICROSOFT ACTIVE DIRECTORY directory service.

The enterprise computing environment 103 can also include an enterprise data store 119. The enterprise data store 119 can be representative of multiple enterprise data stores 119 accessible by components in the networked environment 100. The enterprise data store 119 can store various data associated with the enterprise computing environment 103. For example, the enterprise data store 119 can store user data 123 and compliance rules 126.

The user data 123 stored in the enterprise data store 119 can include data that represents information corresponding to users that are associated with the enterprise computing environment 103. For example, the user data 123 can specify which particular resources, such as data and applications, that a particular user is entitled to access. The user data 123 in some examples can specify the role of a user in the enterprise, such as the job title or business groups to which the user is a member.

The management service 113 can assign various compliance rules 126 to respective client devices 106. The compliance rules 126 can specify, for example, one or more conditions that must be satisfied for the client device 106 to be deemed compliant with the compliance rule 126. In various examples, the enterprise computing environment 103, the client device 106, or both the enterprise computing environment 103 and the client device 106 can determine whether the client device 106 satisfies a compliance rule 126. For example, the client device 106 can generate a data object that describes the state of the client device 106 along with associated information, settings, and parameters. Components in the client device 106 or the management service 113 can evaluate the data object to determine whether the client device 106 is compliant with corresponding compliance rules 126.

In one example, a compliance rule 126 can specify that particular applications are prohibited from being installed in the client device 106. As another example, a compliance rule 126 can specify that the client device 106 must be located in a secured location, such as the premises of the enterprise that operates the enterprise computing environment 103, in order for the client device 106 to be authorized to access or render content in the client device 106. In another example, a compliance rule 126 can specify that a lock screen is required to be generated when the client device 106 is "awoken" from a low power "sleep" state and that a passcode is required for a user to unlock the lock screen.

Various compliance rules 126 can be based on time, geographical location, or device and network properties. For instance, the client device 106 can satisfy a compliance rule 126 when the client device 106 is located within a particular geographic location. The client device 106 can satisfy a compliance rule 126 in other examples when the client device 106 is in communication with a particular local area network, such as a particular local area network that is managed by the enterprise computing environment 103. Furthermore, a compliance rule 126 in another example can be satisfied upon the time and date matching specified values.

Another example of a compliance rule 126 involves whether a user belongs to a particular user group. For instance, a compliance rule 126 can include a whitelist or a blacklist that specifies whether particular users or groups of users are authorized to perform various functionality, such as installing or executing a particular application.

In some examples, an enterprise can operate the management service 113 to ensure that the client devices 106 of its users satisfy respective compliance rules 126. By ensuring that the client devices 106 of its users are operating in compliance with the compliance rules 126, the enterprise can control access to resources and thereby improve the security of devices associated with the enterprise and the users of the client devices 106.

The client device 106 can be representative of multiple client devices 106 that can be coupled to the network 109. The client device 106 can include a processor-based computer system, such as a desktop computer, a laptop computer, a personal digital assistant, a mobile phone, or a tablet computer.

The client device 106 can include a host operating system 136, a host management component 139, and a virtual machine execution environment 143. The host operating system 136 can manage hardware and software resources in the client device 106. The host operating system 136 can also provide various services, such as an interprocess communication service that can facilitate various components within the client device 106 communicating and sharing data with each other.

The host management component 139 can monitor activity and settings in the client device 106, including activity and settings in the virtual machine execution environment 143, and determine whether the client device 106 complies with the compliance rules 126 assigned to the client device 106. In some examples, the host management component 139 can parse a data object that describes the state of and settings in the client device 106 to determine whether the client device 106 is compliant. In other examples, the host management component 139 can communicate with the management service 113 to determine whether the management service 113 deems the client device 106 compliant with compliance rules 126. The host management component 139 can also communicate with various components in the client device 106, such as components in the virtual machine execution environment 143.

The virtual machine execution environment 143 can be an environment in which one or more virtual machines 146 execute in the client device 106. In some examples, the virtual machine execution environment 143 can be a containerized environment. In this regard, the client device 106 can prohibit the transfer of at least some data into and out of the virtual machine execution environment 143. In this way, the operation of components in the virtual machine execution environment 143 can be separate and isolated from other components in the client device 106.

The virtual machine execution environment 143 can include a hypervisor 149 and a virtual machine 146. The virtual machine 146 can be a virtualized computer instance that emulates the operation of components of a physical computer. The virtual machine 146 can be instantiated and executed by the hypervisor 149. The hypervisor 149 can also monitor the operation of the virtual machine 146 and provide status information to the host management component 139 or the management service 113.

In some examples, the hypervisor 149 can be an application that provides an execution platform for one or more virtual machines 146 by providing a containerized environment in which data is allowed to be transmitted to and from a guest operating system only if various compliance rules 126 are satisfied. The hypervisor 149 can obtain a package, such as a disk image file, for the virtual machine 146, and mount or install the package to thereby create the virtual machine 146. The hypervisor 149 can also render user interfaces for a guest operating system and cause the user interfaces to be displayed through a user interface within the host operating system 136. Additionally, the hypervisor 149 can intercept hardware calls made from the guest operating system or guest applications, potentially modify or interpret those calls, and relay the calls to the kernel of the host operating system 136. The hypervisor 149 can also control and allocate system resources for the virtual machine 146 based on management or host operating system 136 instructions and the availability of host resources. The hypervisor 149 can also function as a communication interface between the virtual machine 146 and components outside of the virtual machine execution environment 143.

In some examples, the hypervisor 149 can execute in a mode that makes components executing in the virtual machine 146 appear to be executing natively by the host operating system 136. For example, the hypervisor 149 can hide a console user interface for the virtual machine 146. In addition, the hypervisor 149 can cause user interfaces for components in the virtual machine 146 to be rendered with the formatting and stylization used by user interfaces rendered natively by the host operating system 136.

The virtual machine 146 can include a guest operating system 151 and other components, such as applications, that are installed in the virtual machine 146. The guest operating system 151 can manage emulated hardware and software resources for the virtual machine 146. The guest operating system 151 can also provide various services, such as an interprocess communication service that can facilitate various virtualized components within the virtual machine 146 communicating with each other.

The guest management component 153 can monitor activity and settings in the virtual machine 146. In some examples, the guest management component 153 can parse a data object that describes the state of and settings in the virtual machine 146 to determine whether the virtual machine 146 is compliant. In other examples, the guest management component 153 can communicate with the management service 113 to determine whether the management service 113 deems the virtual machine 146 compliant with compliance rules 126. The guest management component 153 can also communicate with various components in the client device 106, such as the hypervisor 149 and the host management component 139.

As shown in FIG. 1, the host management component 139 can include a virtual machine management server 156 that can include a virtual machine management data store 159. The virtual machine management server 156 can be configured as a local server that can communicate with the hypervisor 149. To this end, the virtual machine management server 156 can be associated with an internet protocol (IP) address and a port number that the hypervisor 149 can use when sending messages to the virtual machine management server 156. In some examples, at least some of the functionality described herein as being performed by the virtual machine management server 156 can instead be performed by the hypervisor 149.

The virtual machine management data store 159 can store virtual machine packages 163 and virtual machine profiles 166 that can be served to the hypervisor 149 through the virtual machine management server 156. A virtual machine package 163 can include one or more files that the hypervisor 149 can extract and execute in order to create a virtual machine 146 and components within the virtual machine 146, such as the guest operating system 151, the guest management component 153, and applications. In some examples, virtual machine packages 163 can include virtual disk files, configuration files, basic input/output system (BIOS) files, memory files, and log files. A virtual machine package 163 can include a disk image that can be mounted by the hypervisor 149.

A virtual machine profile 166 can specify configuration information and restrictions for a virtual machine 146. For example, a virtual machine profile 166 can specify that the virtual machine 146 is prohibited from accessing attached storage devices, such as universal serial bus (USB) drives, that can be attached to the client device 106. Another example of a virtual machine profile 166 can specify that a particular virtual private network (VPN) is to be created for a virtual machine 146 so that the virtual machine 146 can communicate securely with the enterprise computing environment 103. As another example, a virtual machine profile 166 can specify an expiration date for a virtual machine 146, which can set a time when the virtual machine 146 is no longer permitted to exist in the client device 106.

Next, examples of the operation of the networked environment 100 are described. The following discussion assumes that the host management component 139 is executing in the client device 106 and that the client device 106 is enrolled with the management service 113 so that the management service 113 can monitor and manage activity in the client device 106. The following examples also assume that the virtual machine execution environment 143 has not yet been created in the client device 106.

To begin, the management service 113 can provide or facilitate access to a repository through which the client device 106 can obtain applications. For example, the management service 113 can create a portal through which the user of the client device 106 can view a list of applications that the management service 113 has determined as being authorized for use by the client device 106. The particular applications that the management service 113 makes available to the user can depend on the role of a user in the enterprise, such as the job title or business groups to which the user is a member as indicated by the user data 123 stored in the enterprise data store 119. For instance, if the user is an accountant for the enterprise, the management service 113 can make accounting applications available to the user.

If the user requests to access a particular application, the management service 113 or the host management component 139 can determine whether the client device 106 is required to execute the application using a virtual machine 146. The management service 113 can determine that the client device 106 is required to execute the application using a virtual machine 146 for various reasons. For example, a compliance rule 126 assigned to the client device 106 can specify that the user is required to execute the application through a virtual machine 146. As another example, the management service 113 can determine that the virtual machine 146 is required to execute the application by virtue of the application being incompatible with the host operating system 136 in the client device 106. The management service 113 can determine whether the application is compatible with the client device 106 by, for example, comparing a list of compatible operating systems for the application with the host operating system 136, which can be specified in a data object generated by the host management component 139 and provided to the management service 113.

Once the management service 113 determines that the client device 106 is required to execute the application through a virtual machine 146, the management service 113 can determine whether a compatible virtual machine 146 is already installed in the client device 106. To this end, the management service 113 can obtain, from the host management component 139, a data object that specifies the installed components in the client device 106. In another example, the management service 113 can request the host management component 139 to provide an indication of whether a compatible virtual machine 146 is installed in the client device 106.

If a virtual machine 146 is installed in the client device 106, the management service 113 can determine whether the virtual machine 146 is compatible with the application selected by the user. In addition, the management service 113 can determine whether the virtual machine 146 is authorized to execute the application. To this end, the management service 113 can determine whether the name and version number of the hypervisor 149, as indicated by a data object specifying installed components in the client device 106, is in a list of virtual machines 146 that is compatible with and authorized to execute the application.

If the management service 113 determines that the virtual machine 146 is not installed in the client device 106, the management service 113 can determine whether the hypervisor 149 is already installed in the client device 106. To this end, the management service 113 can parse a data object describing components installed in the client device 106, or the management service 113 can request the host management component 139 to provide an indication of whether the hypervisor 149 is installed in the client device 106.

If a hypervisor 149 is installed in the client device 106, the management service 113 can determine whether the hypervisor 149 is authorized to instantiate, execute, and manage the virtual machine 146. In some examples, the management service 113 can determine whether the name and version number of the hypervisor 149, as indicated by a data object describing components installed in the client device 106, is in a list of hypervisors 149 that are authorized to instantiate, execute, and manage the virtual machine 146.

In addition, the management service 113 can also determine whether the hypervisor 149 is compatible with the virtual machine 146. To this end, the management service 113 can determine whether the name and version number of the hypervisor 149, as indicated by a data object specifying installed components in the client device 106, is in a list of hypervisors 149 that are compatible with the virtual machine 146.

If an authorized hypervisor 149 is not installed in the client device 106, the management service 113 can provide the host management component 139 with an installation package for the hypervisor 149. For example, the management service 113 can transmit the installation package to the host management component 139 and instruct the host management component 139 to execute the installation package. In another example, the management service 113 can instruct the host management component 139 to retrieve the installation package from a specified storage location and instruct the host management component 139 to execute the installation package to thereby install the hypervisor 149.

Once the hypervisor 149 is installed in the client device 106, the management service 113 can provide the client device 106 with the virtual machine 146 required for the user to access the requested application. In some examples, the management service 113 can create and store several virtual machine packages 163 of various configurations. For instance, the management service 113 can generate multiple virtual machine packages 163 that, when installed in the client device 106, emulate various computer systems or include various guest operating systems 151. In other examples, the management service 113 can generate a virtual machine package 163 for a virtual machine 146 in response to the user requesting access to an application. For example, if an application requires a particular type of guest operating system 151 and virtual machine 146, the management service 113 can generate a virtual machine package 163 that, when installed by the client device 106, generates the virtual machine 146 having the specified guest operating system 151. In some examples, the virtual machine package 163 can include files and data so that the application and guest management component 153 are already installed in the virtual machine 146 when the virtual machine package 163 is installed by the hypervisor 149.

In addition to creating or selecting a virtual machine package 163 for the client device 106, the management service 113 can generate or select a virtual machine profile 166 for the virtual machine 146. As discussed above, the virtual machine profile 166 can specify configuration information and restrictions for the virtual machine 146. The management service 113 can determine the particular restrictions for the virtual machine profile 166 based on the compliance rules 126 assigned to the client device 106. For example, if a compliance rule 126 specifies that the client device 106 is not permitted to access devices attached to the client device 106 through a USB port, the virtual machine profile 166 can prohibit the virtual machine 146 from accessing devices attached to the client device 106 through a USB port by, for example, configuring a BIOS associated with the guest operating system 151 so that a virtual USB port of the virtual machine 146 is disabled.

Once the management service 113 has created or selected a virtual machine package 163 and virtual machine profile 166 for the client device 106, the management service 113 can provide the virtual machine package 163 and the virtual machine profile 166 to the host management component 139. In one example, the management service 113 can aggregate the virtual machine package 163 and the virtual machine profile 166 into a single package that the management service 113 can transmit to the host management component 139. In other examples, the management service 113 can store the virtual machine package 163 and virtual machine profile 166 in the enterprise data store 119 and instruct the host management component 139 to retrieve the virtual machine package 163 and the virtual machine profile 166 from the enterprise data store 119. In examples in which the host management component 139 retrieves the virtual machine package 163 and virtual machine profile 166 from the enterprise data store 119, the management service 113 can provide the host management component 139 with information that specifies the particular storage locations of the virtual machine packages 163 and virtual machine profiles 166.

Once the host management component 139 obtains the virtual machine package 163 and the virtual machine profile 166, the host management component 139 can store the virtual machine package 163 and the virtual machine profile 166 in the virtual machine management data store 159 of the virtual machine management server 156. For examples in which the management service 113 provides the virtual machine package 163 and the virtual machine profile 166 as a package to the host management component 139, the host management component 139 can extract the package prior to storing the virtual machine package 163 and the virtual machine profile 166 in the virtual machine management data store 159.

After the virtual machine package 163 and the virtual machine profile 166 have been stored in the virtual machine management data store 159, the host management component 139 can instruct the hypervisor 149 to retrieve and install the virtual machine package 163 and virtual machine profile 166. To this end, the host management component 139 can send a command to the hypervisor 149 to install the virtual machine package 163 and the virtual machine profile 166, and the command can specify the location of the virtual machine package 163 and the virtual machine profile 166. In some examples, the location of the virtual machine package 163 and the virtual machine profile 166 can be specified as an IP address and port number.

When the hypervisor 149 receives the instruction to install the virtual machine package 163 and virtual machine profile 166, the hypervisor 149 can retrieve the virtual machine package 163 and the virtual machine profile 166 from the virtual machine management server 156. The hypervisor 149 can then install the virtual machine package 163, resulting in the creation of the virtual machine 146, including the guest operating system 151, in the virtual machine execution environment 143. In some examples, the virtual machine package 163 can include a disk image, and installing the virtual machine package 163 can include installing or mounting the virtual machine package 163. The hypervisor 149 can also install the virtual machine profile 166, which can specify restrictions that the hypervisor 149 can enforce against the virtual machine 146. In some examples, the virtual machine profile 166 can be installed in a profile bank of the guest operating system 151, causing the guest operating system 151 to operate in accordance with configurations specified in the virtual machine profile 166.

After the virtual machine 146 is installed in the client device 106, it may be necessary to bind the virtual machine 146 with a domain in the directory service 116 so that the virtual machine 147 can access resources associated with the enterprise computing environment 103. The domain can be, for example, a partition of an enterprise network in which resources, such as user accounts and client devices 106, are registered with a database maintained by a domain controller for the enterprise computing environment 103. To bind the virtual machine 146 with the domain, the management service 113 can collect information describing the virtual machine 146 and then, based on this information, create a domain object in the directory service 116 on behalf of the virtual machine 146. In response to the domain object being created, the domain controller of the directory service 116 can return a domain data object to the management service 113. The management service 113 can then transfer the domain data object to the guest operating system 151 of the virtual machine 146. Once the guest operating system 151 has obtained the domain data object, the guest operating system 151 can execute an offline domain join function, such as the djoin.exe command for a WINDOWS operating system, with the domain data object being a parameter for the function. As a result, the virtual machine 146 can be bound to the domain in the directory service 116.

When the hypervisor 149 has completed the installation of the virtual machine 146, the hypervisor 149 can notify the host management component 139 of the completion of this task. Thereafter, the client device 106 can install the guest management component 153 in the virtual machine 146. It is noted that, in some examples, the guest management component 153 can already be installed in the virtual machine 146 in examples in which installation of the virtual machine package 163 includes installation files that result in installation of the guest management component 153.

The client device 106 can install the guest management component 153 in the virtual machine 146 in various ways. In one example, the host management component 139 can retrieve an installation package for the guest management component 153 from the enterprise data store 119 and then provide the installation package to the hypervisor 149 with an instruction to execute the installation package. In another example, the host management component 139 can provide the hypervisor 149 with a command to retrieve an installation package for the guest management component 153 from the enterprise data store 119. In some examples, the command to retrieve the installation package and specify a storage location of the installation package for the guest management component 153.

Once the hypervisor 149 has obtained the installation package for the guest management component 153, the hypervisor 149 can provide the installation package to the guest operating system 151 of the virtual machine 146 and instruct the guest operating system 151 to install the guest management component 153. When the guest management component 153 is installed, the guest management component 153 can enroll the virtual machine 146 with the management service 113 and obtain compliance rules 126 for the virtual machine 146 from the management service 113. The guest management component 153 can then monitor and control activity in the virtual machine 146 based on the compliance rules 126.

In some examples, the guest management component 153 can communicate with the management service 113 through the hypervisor 149. For example, the guest operating system 151 can provide messages from the guest management component 153 to the hypervisor 149, which can route the messages through a virtual interface for the network 109 to the management service 113. The hypervisor 149 can receive messages from the management service 113 through the virtual interface and then provide the received messages to the guest operating system 151 for forwarding to the guest management component 153.

In other examples, the host management component 139 can be an interface for communications between the guest management component 153 and the management service 113. For example, the hypervisor 149 can route messages from the guest management component 153 to the host management component 139. Upon receiving a message originating from the guest management component 153, the host management component 139 can forward the message to the management service 113 through the network 109. When the host management component 139 receives a message from the management service 113 that is destined for the guest management component 153, the host management component 139 can provide the message to the hypervisor 149, which can then forward the message to the guest management component 153. Thus, as described above, the guest management component 153 can communicate with the management service 113 through the host management component 139 in various examples.

As discussed above, in some examples, the virtual machine package 163 can include installation files that cause the application requested by the user to be installed in the virtual machine 146 when the virtual machine package 163 is executed. In other examples, the requested application can be installed in the virtual machine 146 after the virtual machine 146 has been installed in the client device 106. In these examples, various components in the client device 106 can cause the application to be installed in the virtual machine 146.

In one example, the host management component 139 can retrieve an installation file for the application from the management service 113. Upon receiving the installation file, the host management component 139 can provide the installation file to the hypervisor 149 and instruct the hypervisor 149 to execute the installation file to thereby install the application in the virtual machine 146. In another example, the host management component 139 or the management service 113 can request the hypervisor 149 to retrieve the installation file from a particular storage location and to execute the installation file. In another example, the guest management component 153 can retrieve the installation file for the application and install the application by causing the guest operating system 151 to execute the retrieved installation file.

Once the application is installed in virtual machine 146, the management service 113 can instruct the hypervisor 149 to operate in a mode that makes components executing in the virtual machine 146 appear to be executing natively by the host operating system 136. For example, the hypervisor 149 can hide a console user interface for the virtual machine 146 and cause user interfaces for components in the virtual machine 146 to be rendered with formatting and stylization used by user interfaces rendered by the host operating system 136. In this way, the user can experience and operate the application as if were executing natively by the host operating system 136, even though it is actually being executed through emulation in the virtual machine execution environment 143.

Figure 2A:
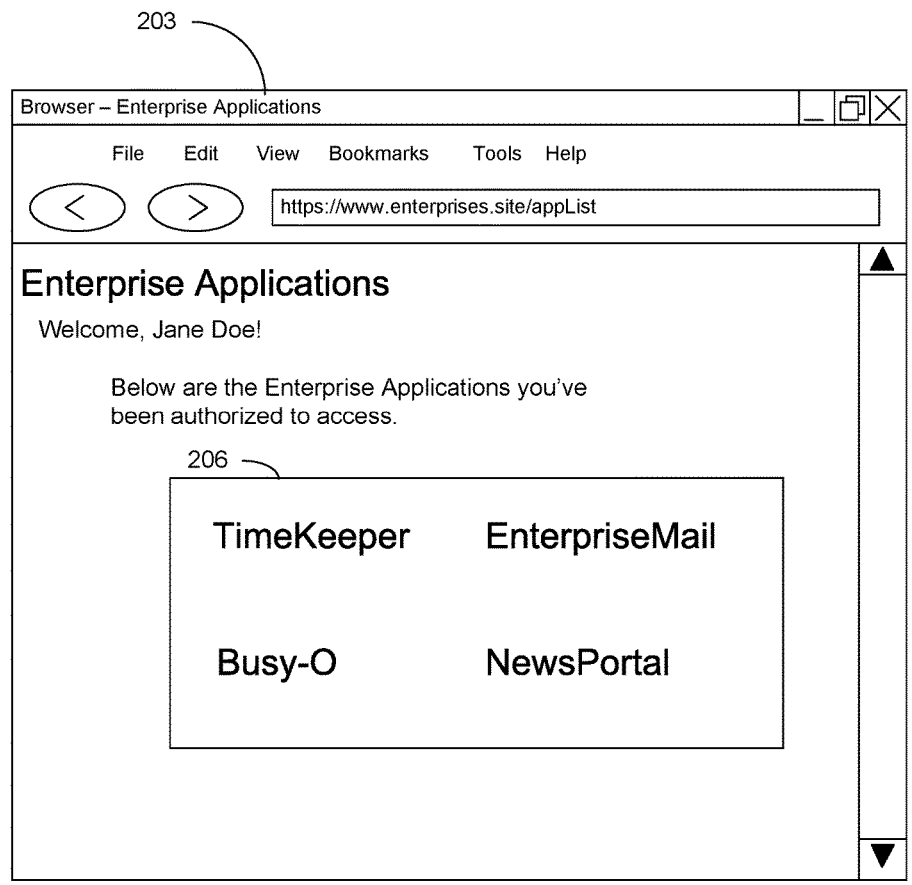
FIGS. 2A-2B are examples of user interfaces rendered by a client device.

With reference to FIG. 2A, shown is an example of a user interface 203 that can be encoded by the management service 113 and rendered by the client device 106. The user interface 203 shown includes a listing 206 of applications that the management service 113 has determined as being accessible to the user of the client device 106. As discussed above, the management service 113 can make particular applications available to the user dependent upon the role of a user in the enterprise. The role of the user can be specified by the job title or business groups to which the user is a member, which may be indicated by the user data 123 stored in the enterprise data store 119.

Figure 2B:
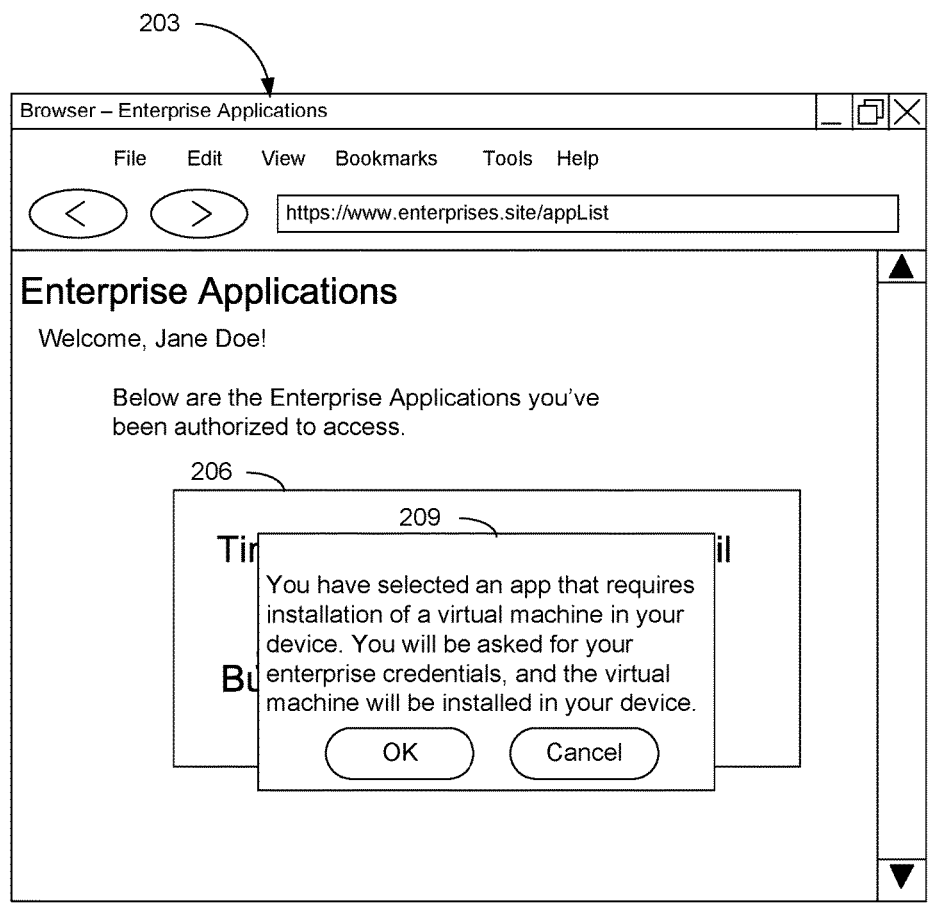

With reference to FIG. 2B, shown is an example of the user interface 203 after the user of the client device 106 has selected an application that the management service 113 has determined as being accessible to the user through a virtual machine 146. As discussed above, a compliance rule 126 assigned to the client device 106 can specify that the user is required to execute the application through a virtual machine 146. As another example, the client device 106 may require the virtual machine 146 to execute the application by virtue of the application being incompatible with the host operating system 136 in the client device 106.

In response to the user selecting an application that requires a virtual machine 146, the user interface 203 can provide a notification 209 indicating that the application requires the virtual machine 146. The notification 209 can inform the user that the management service 113 is initiating installation of the virtual machine 146 in the user's client device 106.

Figure 3A:
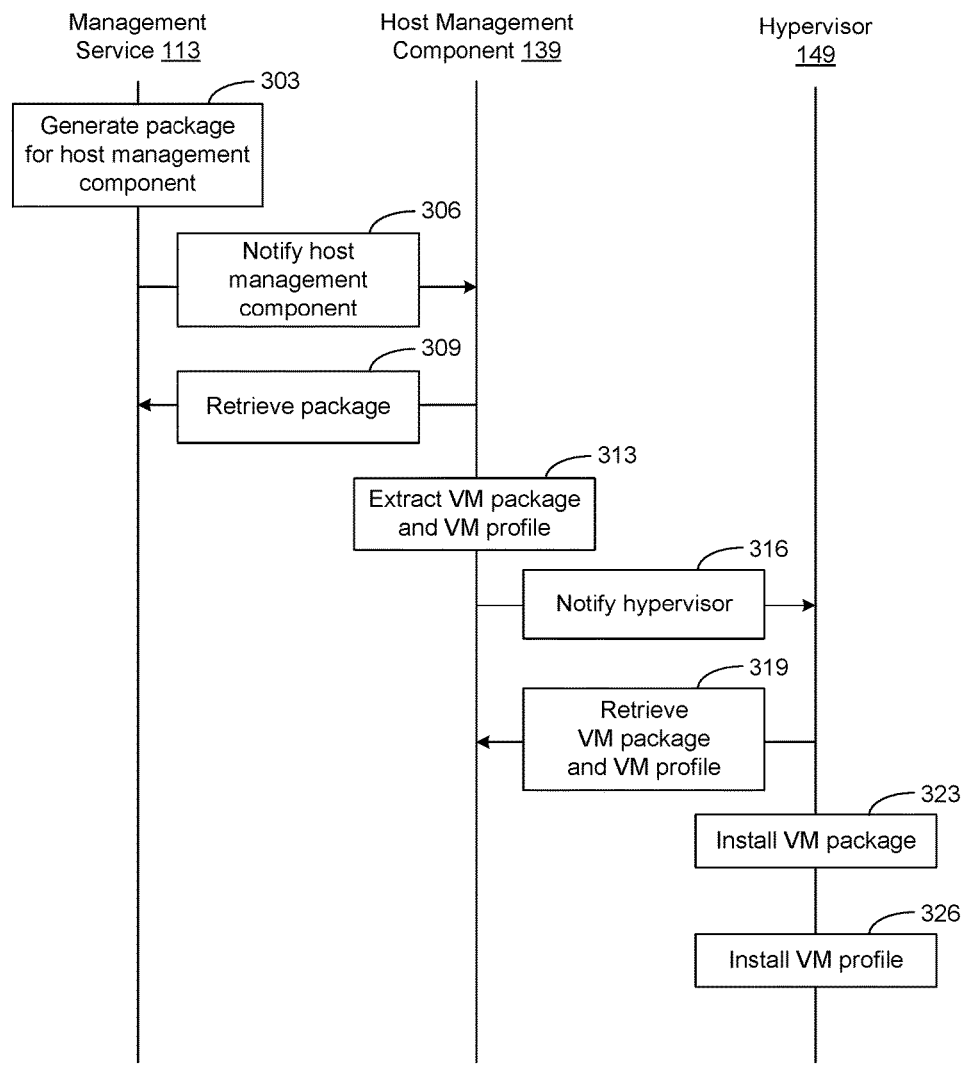
FIGS. 3A-3B show a sequence diagram illustrating an example of component interaction.
Figure 3B:
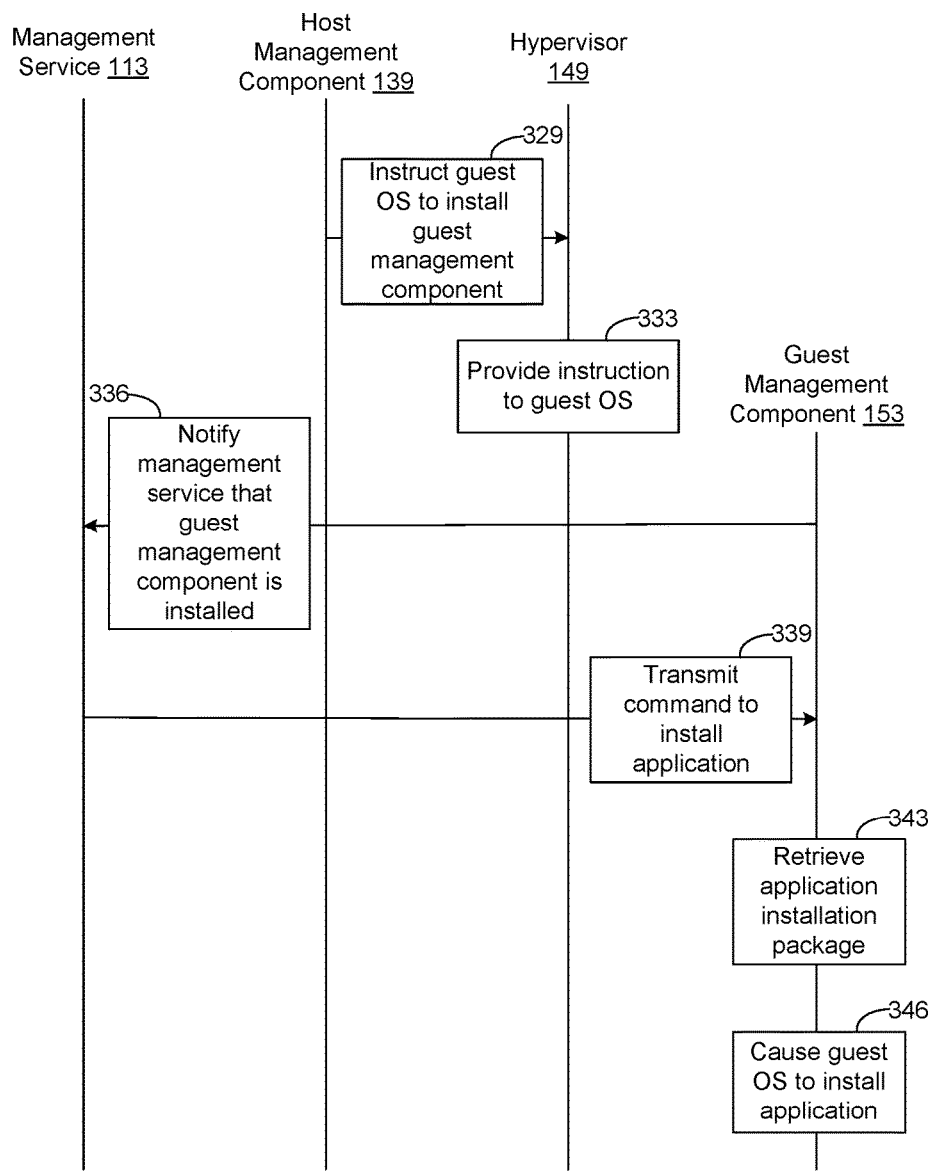

With reference to FIGS. 3A-3B, shown is a sequence diagram illustrating an example of interactions of components in the networked environment 100. The sequence diagram of FIGS. 3A-3B illustrates an example of the management service 113 causing a virtual machine 146 to be installed in the client device 106.

Beginning with step 303, the management service 113 can generate a package for the host management component 139 that can include a virtual machine package 163 and a virtual machine profile 166. In some examples, the generated package can include or be embodied in the form of a device profile for the host management component 139.

At step 306, the management service 113 can notify the host management component 139 that the management service 113 has created the package and instruct the host management component 139 to retrieve the package. In other examples, the management service 113 can push the package to the host management component 139. As shown at step 309, the host management component 139 can then retrieve the package from the management service 113.

Once the host management component 139 retrieves the package, the host management component 139 can extract the virtual machine package 163 and the virtual machine profile 166 from the retrieved package, as shown at step 313, and store the virtual machine package 163 and virtual machine profile 166 in the virtual machine management server 156 that exists in the client device 106. At step 316, the host management component 139 can notify the hypervisor 149 that the host management component 139 has obtained the virtual machine package 163 and the virtual machine profile 166 and instruct the hypervisor 149 to retrieve these resources from the virtual machine management server 156. As discussed above, the host management component 139 can provide the hypervisor 149 with an IP address and port number of the virtual machine management server 156 for the hypervisor 149 to obtain the virtual machine package 163 and the virtual machine profile 166.

As shown at step 319, the hypervisor 149 can retrieve the virtual machine package 163 and the virtual machine profile 166 from the virtual machine management server 156. At step 323, the hypervisor 149 can install the virtual machine package, which can result in the virtual machine 146 being created in the virtual machine execution environment 143.

In addition, as shown at step 326, the hypervisor 149 can install the virtual machine profile 166. As discussed above, the virtual machine profile 166 can specify configuration information and restrictions for the virtual machine 146. For example, the virtual machine profile 166 can specify that the hypervisor 149 must destroy the virtual machine 146 at a specified time. The hypervisor 149 can destroy the virtual machine 146 by, for example, deleting files that represent the virtual machine 146.

At step 329, which is shown in FIG. 3B, the host management component 139 can then provide an instruction to the hypervisor 149 to that causes the guest management component 153 to be installed in the virtual machine 146. As shown at step 333, the hypervisor 149 can then provide the received instruction to the guest operating system 151. In response, the guest operating system 151 can install the guest management component 153.

Once the guest management component 153 is installed in the virtual machine 146, the guest management component 153 can notify the management service 113 of the installation, as indicated at step 336. In some examples, the notification can be transmitted through the hypervisor 149 and the host management component 139. In other examples, the notification can be transmitted without being relayed through the host management component 139.

When the management service 113 is notified of the installation of the guest management component 153, the management service 113 can enroll the guest management component 153 with the management service 113. To this end, the management service 113 can authenticate the user of the client device 106 using credentials, such as a username and password. In addition, the guest operating system 151 can register the guest management component 153 as a device administrator of the virtual machine 146.

As shown at step 339, the management service 113 can then transmit a command to the guest management component 153 to install an application. The application can be an application to which the user of the client device 106 requested to access. In some examples, the management service 113 can transmit the notification directly to the guest management component 153 through the network 109. In other examples, the management service 113 can transmit the command to the host management component 139, which can then forward the command to the guest management component 153.

Upon receiving the command to install the application, the guest management component 153 can retrieve the installation package for the application, as shown at step 343. To this end, the management service 113 can specify the storage location from where the guest management component 153 can download the installation package. In other examples, the host management component 139 can download the installation package and provide the installation package to the guest management component 153. In alternative examples, the guest operating system 151 can retrieve the installation package.

After the guest management component 153 has obtained the installation package for the application, the guest management component 153 can cause the guest operating system 151 to install the application in the virtual machine 146, as indicated at step 346. To this end, the guest management component 153 can request the guest operating system 151 to execute the installation package to thereby install the application in the virtual machine 146. For example, the guest management component 153 can provide the installation package to the guest operating system 151 and instruct the guest operating system 151 to execute the installation package to install the application. Additionally, the guest management component 153 can configure the installed application. For instance, the guest management component 153 can apply a configuration policy and modify settings, such as an application-specific virtual private network profile, for the application. Thereafter, the process can end.

Figure 4:
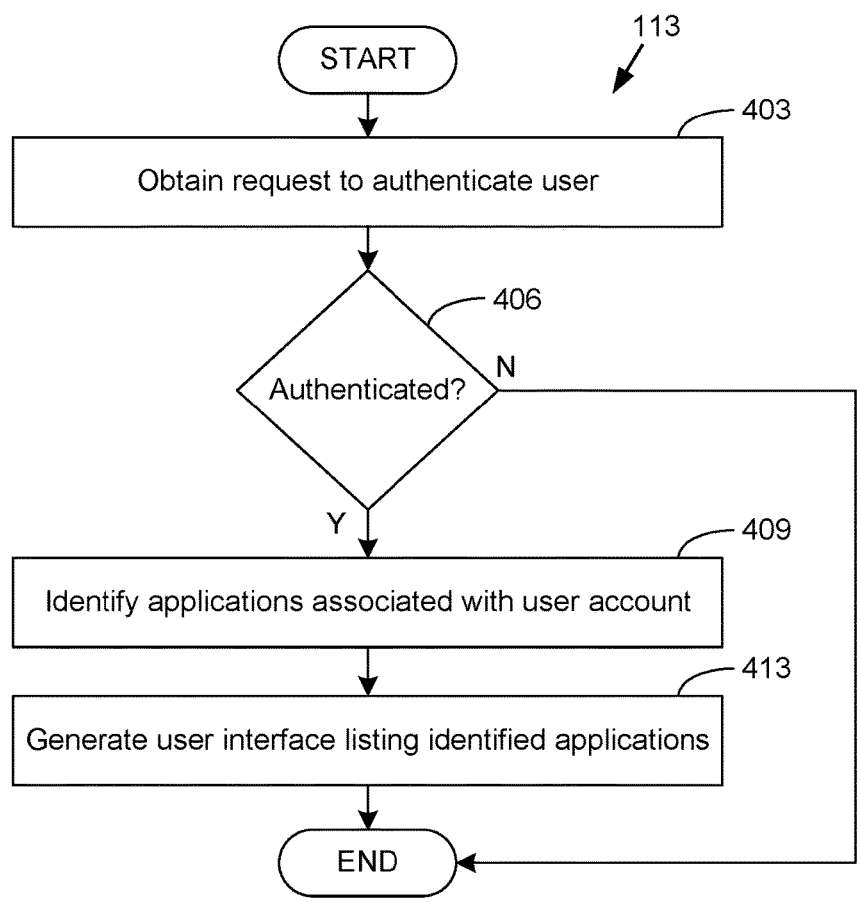
FIGS. 4 and 5A-5C are a flowchart illustrating examples of functionality implemented by a management service.

With reference to FIG. 4, shown is a flowchart that provides an example of a portion of the operation of the management service 113. In particular, FIG. 4 provides an example of the management service 113 generating a user interface, such as a user interface for a portal of an application repository, that identifies applications for which the management service 113 authorizes access. The flowchart of FIG. 4 can be viewed as depicting an example of a method implemented in the enterprise computing environment 103.

Beginning with step 403, the management service 113 can obtain a request to authenticate a user. The request to authenticate the user can originate from a user interface 203 in which a user enters authentication credentials. At step 406, the management service 113 can determine whether the user can be authenticated based upon the request. The user can be authenticated based on, for example, a username and password or biometric data. If the user cannot be authenticated, the process can proceed to completion. In some scenarios, an error can be presented in the user interface 203 indicating that the user could not be authenticated or that the user can initiate another attempt to authenticate his or her user credentials.

If the user is authenticated at step 406, the process can proceed to step 409, where the management service 113 can identify the applications that are associated with the user data 123 for the user of the client device 106. In some examples, a record in the user data 123 can specify that the user is a member of a particular group and that the particular group is associated with a list of specified applications. The list of applications can include applications that can be installed and executed natively in the client device 106, applications that can be executed through a browser, and applications that can be executed through emulations by a virtual machine 146 in the client device 106. At step 413, the management service 113 can generate the user interface 203 that lists the identified applications.

Figure 5A:
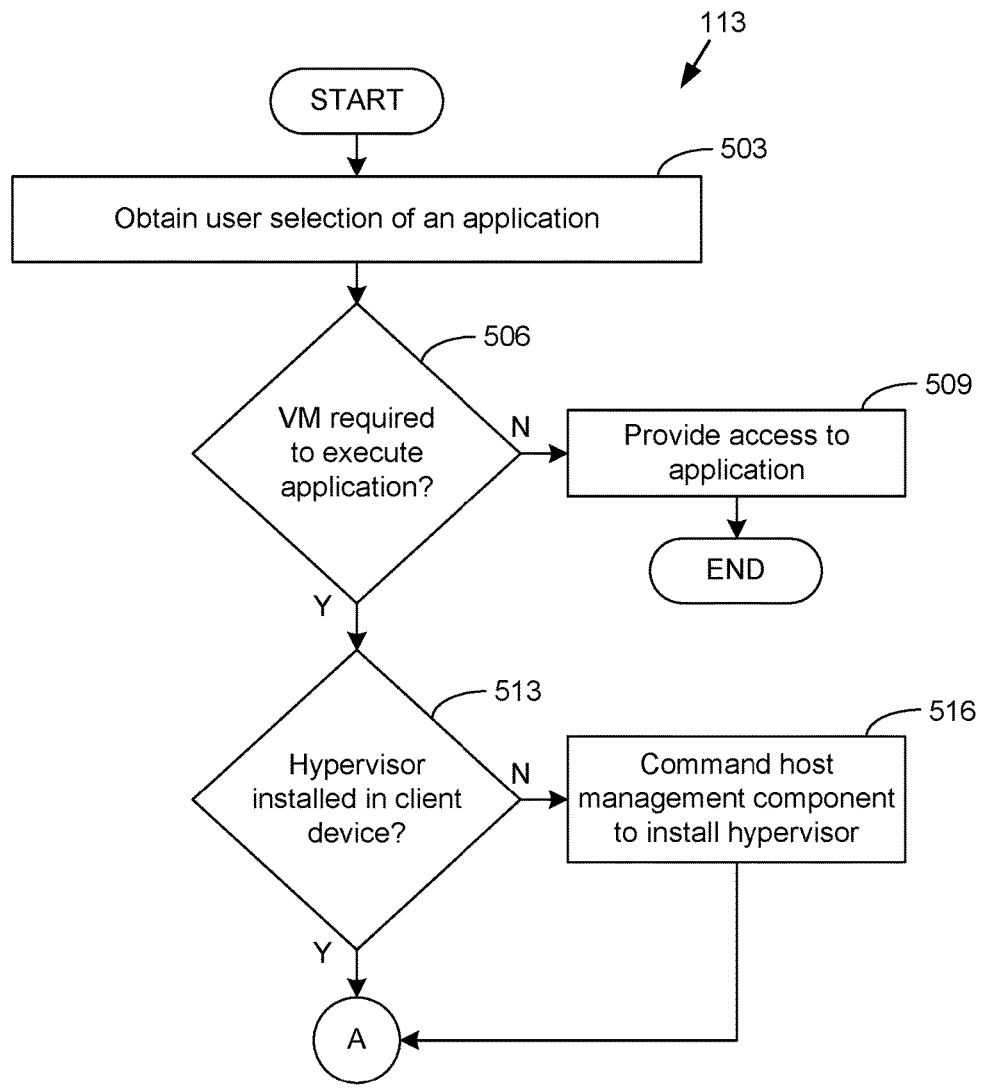
Figure 5B:
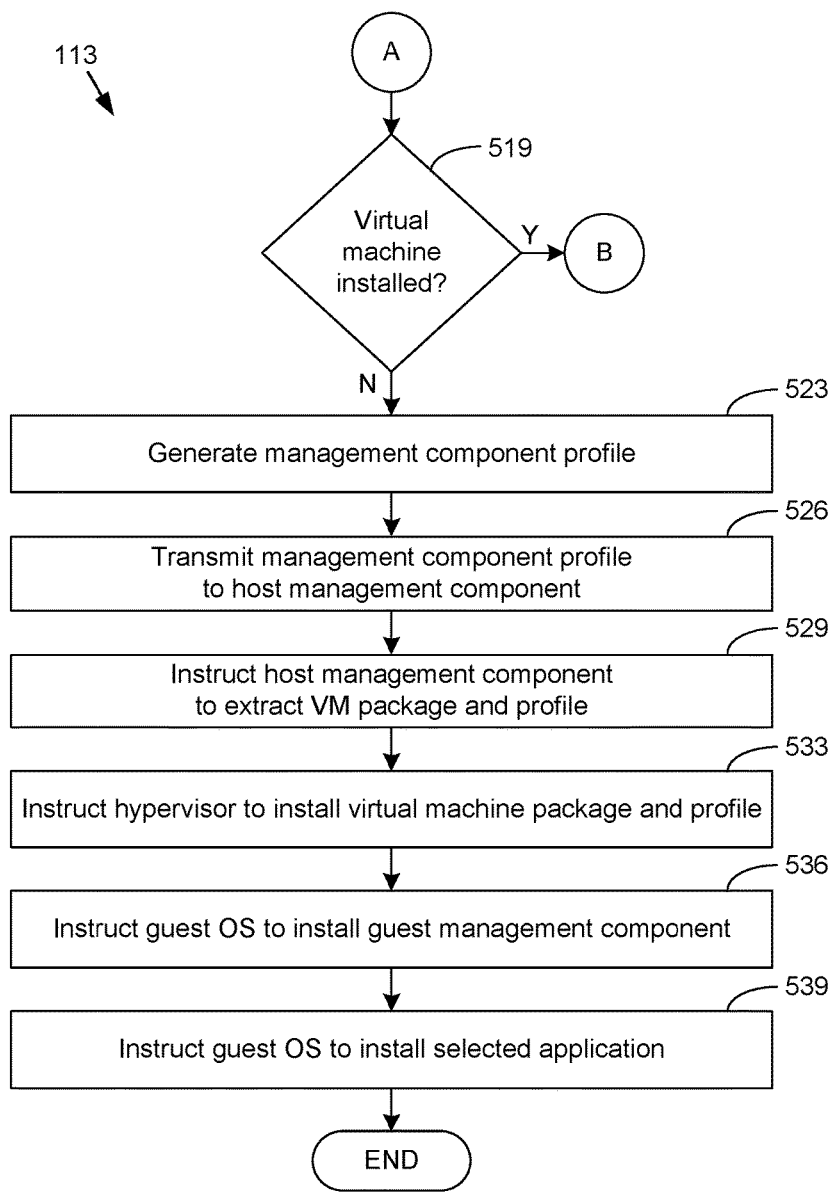
Figure 5C:
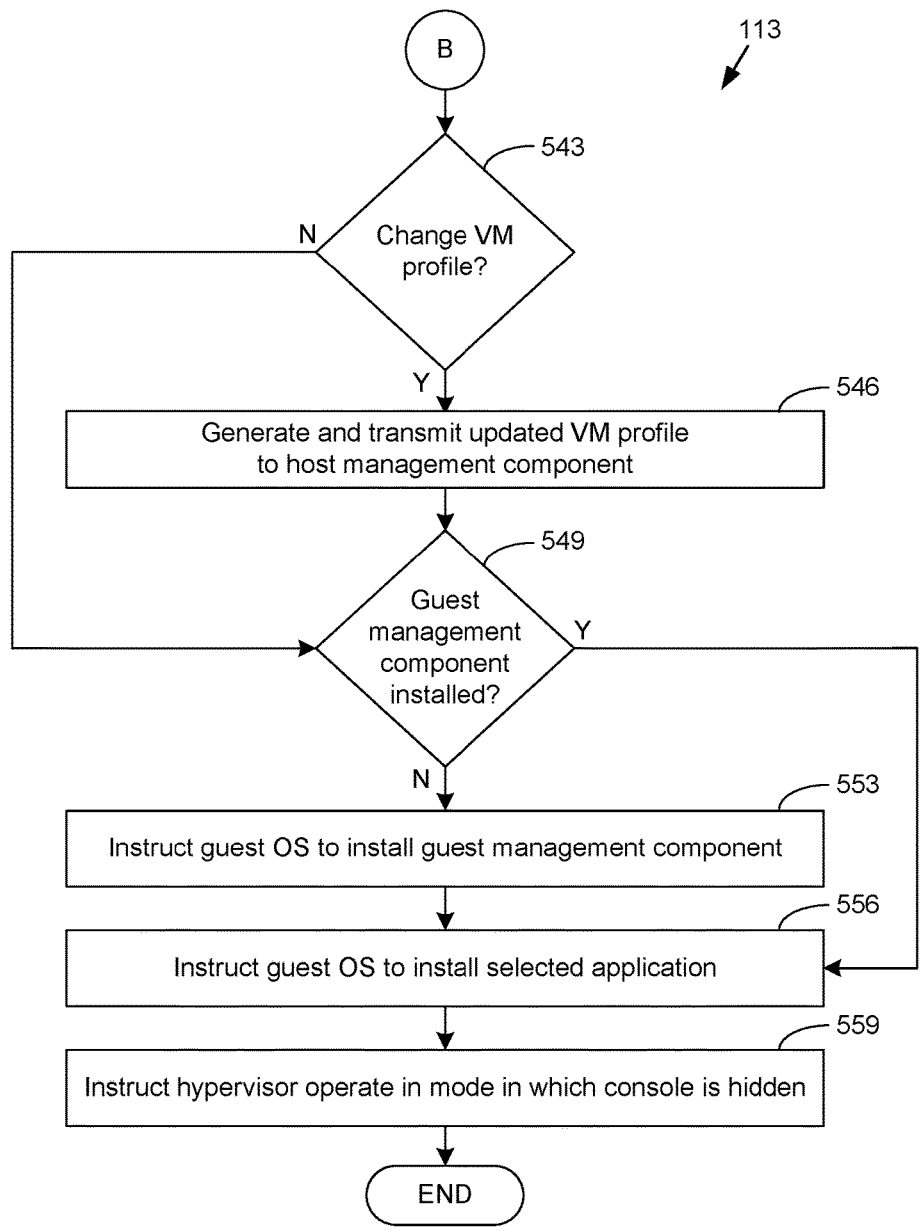

With reference to FIGS. 5A-5C, shown is a flowchart that provides an example of an additional portion of the operation of the management service 113. In particular, FIGS. 5A-5C provide an example of the management service 113 deploying a virtual machine 146 in a client device 106 in response to determining that the virtual machine 146 is required to execute an application. The flowchart of FIGS. 5A-5C can be viewed as depicting an example of a method implemented in the enterprise computing environment 103.

Beginning with step 503, the management service 113 can obtain a user selection of an application. For example, a user can select a particular application of multiple applications that are identified in the user interface 203.

At step 506, the management service 113 can determine whether a virtual machine 146 is required to execute the selected application. For example, a compliance rule 126 can require the application to be executed in the virtual machine 146. As another example, the virtual machine 146 can be required by virtue of the application being incompatible with the host operating system 136 in the client device 106.

If the virtual machine 146 is not required to execute the application, the management service 113 can move to step 509 and provide access to the application. In some examples, the management service 113 can determine that the client device 106 complies with applicable compliance rules 126 prior to providing access to the application.

If the management service 113 determines that a virtual machine 146 is required to execute the application, the management service 113 can move to step 513 and determine whether a hypervisor 149 is installed in the client device 106. If a hypervisor 149 is not installed, the management service 113 can command the host management component 139 to install the hypervisor 149, as shown at step 516. Thereafter, or if the hypervisor 149 is already installed in the client device 106, the management service 113 can move to step 519, which is shown in FIG. 5B.

As shown at step 519, the management service 113 can determine whether a virtual machine 146 is already installed in the client device 106. To this end, the management service 113 can parse a data object that indicates characteristics of the client device 106, including the particular components installed in the client device 106. In other examples, the client device 106 can query the host management component 139 to determine whether a virtual machine 146 is installed in the client device 106.

If a virtual machine 146 is not installed in the client device 106, the management service 113 can then generate a package that includes a virtual machine package 163 and a virtual machine profile 166, as shown at step 523. As discussed above, the virtual machine package 163 can include one or more files that the hypervisor 149 can extract and install or mount in order to create a virtual machine 146 and components within the virtual machine 146, such as the guest operating system 151, the guest management component 153, and applications. The virtual machine profile 166 can specify configuration information and restrictions for the virtual machine 146.

At step 526, the management service 113 can transmit the generated package to the host management component 139 in the client device 106. Then, as shown at step 529, the management service 113 can instruct the host management component 139 to extract the virtual machine package 163 and the virtual machine profile 166 from the transmitted package.

As indicated at step 533, the management service 113 can instruct the hypervisor 149 to install the extracted virtual machine package 163 and the virtual machine profile 166. The instruction to install the virtual machine package 163 can include an instruction to install or mount the virtual machine package 163, which can include a virtual machine disk image. In some examples, the instruction can be provided to the host management component 139, and the host management component 139 can forward the instruction to the hypervisor 149. In other examples, management service 113 can transmit the instruction directly to the hypervisor 149 without using the host management component 139 as an intermediary.

The management service 113 can then move to step 536 and instruct the guest operating system 151 to install the guest management component 153 in the virtual machine 146. In some examples, the instruction can be provided to the host management component 139, and the host management component 139 can forward the instruction to the guest operating system 151 through the hypervisor 149. In other examples, the management service 113 can transmit the instruction directly to the guest operating system 151, without having the host management component 139 forward the instruction.

As shown at step 539, the management service 113 can instruct the guest operating system 151 to install the application selected by the user. To this end, the management service 113 can provide an installation package for the application to the guest operating system 151 along with an instruction to execute the installation package. In another example, the management service 113 can provide the guest operating system 151 with data specifying a location, such as a uniform resource locator and port number, from which the guest operating system 151 can obtain the installation package. In alternative examples, the host management component 139 or the guest management component 153 can provide the instruction for the guest operating system 151 to install the application. After step 539, the process can end.

As indicated at step 519, if the virtual machine 146 is already installed in the client device 106, the management service 113 can proceed to step 543, which is shown in FIG. 5C. At step 543, the management service 113 can determine whether to change the virtual machine profile 166 installed in the virtual machine execution environment 143. As discussed above, the particular virtual machine profile 166 can be based upon the compliance rules 126 assigned to the client device 106. If the management service 113 determines to not change the virtual machine profile 166, the management service 113 can proceed to step 549, as shown. Otherwise, if the management service 113 determines to change the virtual machine profile 166, the management service 113 can move to step 546 to generate and transmit an updated virtual machine profile to the host management component 139.

At step 549, the management service 113 can identify whether the guest management component 153 is installed in the virtual machine 146. To this end, the management service 113 can parse a data object for the virtual machine 146 or the client device 106 that identifies the components installed in the virtual machine 146. In other examples, the management service 113 can request the host management component 139 or the guest operating system 151 to provide an indication as to whether the guest management component 153 is present in the virtual machine 146. If the guest management component 153 is already installed, the management service 113 can proceed to step 556, as shown.

Otherwise, if the management service 113 identifies that the guest management component 153 is not installed in the virtual machine 146, the management service 113 can move to step 553 and instruct the guest operating system 151 to install the guest management component 153. For example, the management service 113 can provide an installation package for the guest management component 153 in addition to an instruction for the guest operating system 151 to execute the installation package. In alternative examples, the management service 113 can provide the guest operating system 151 a storage location from where the guest operating system 151 can obtain the installation package.

As indicated at step 556, the management service 113 can then instruct the guest operating system 151 to install the application selected by the user. To this end, the management service 113 can provide the guest operating system 151 with an installation package for the application along with an instruction to execute the installation package. In other examples, the management service 113 can specify a storage location for the installation package along with an instruction to download and execute the installation package.

At step 559, the management service 113 can then instruct the hypervisor 149 to operate in a mode that makes components executing in the virtual machine 146 appear to be executing natively by the host operating system 136. In some examples, the hypervisor 149 can be a VMWARE virtualization product, and the instruction can be an instruction for the hypervisor 149 to operate in "Unity mode." In other examples, the hypervisor 149 can be a PARALLELS virtualization product, and the management service 113 can instruct the hypervisor 149 to operate in "coherence mode." In response to the instruction, the hypervisor 149 can hide a console user interface for the virtual machine 146 and cause user interfaces for components in the virtual machine 146 to be rendered with the formatting and stylization used by user interfaces rendered by the host operating system 136. When the hypervisor 149 operates in this mode, the application can appear to the user as if the application is installed and being executed natively under the host operating system 136 in the client device 106.

Figure 6:
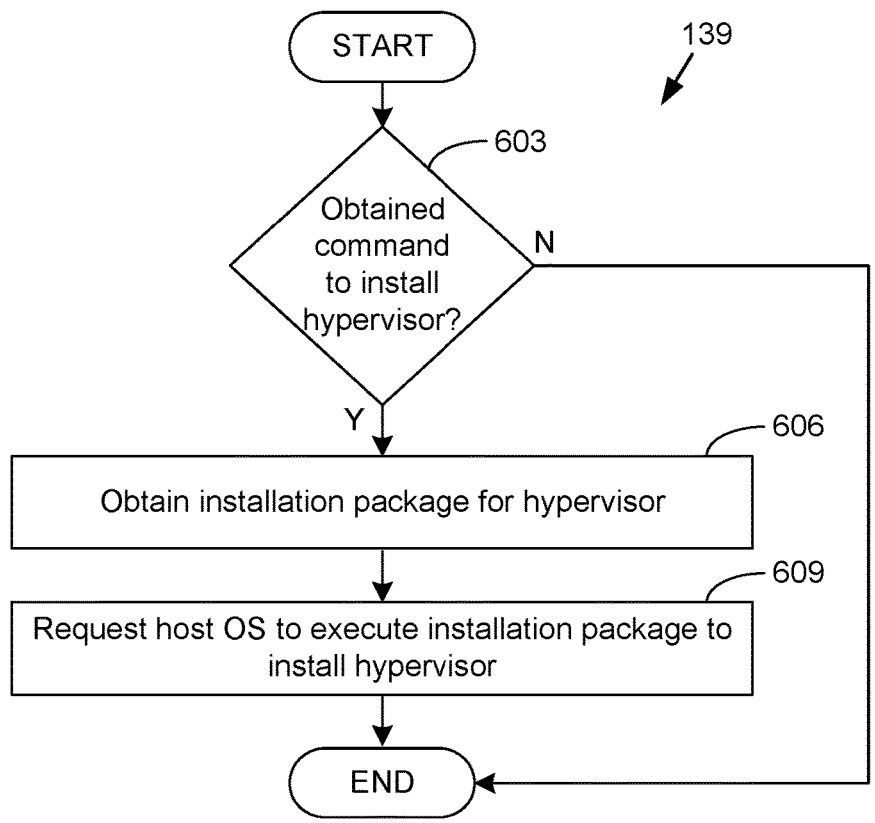
FIG. 6-8 are flowcharts illustrating examples of functionality implemented by a host management component.

With reference to FIG. 6, shown is a flowchart that provides an example of a portion of the operation of the host management component 139. In particular, FIG. 6 provides an example of the host management component 139 installing the hypervisor 149 in the client device 106. The flowchart of FIG. 6 can be viewed as depicting an example of a method implemented in the client device 106.

Beginning with step 603, the host management component 139 can determine whether the host management component 139 has obtained a command to install the hypervisor 149, which can cause the host operating system 136 to install the hypervisor 149. The management service 113 can transmit the command to install the hypervisor 149 to the host management component 139. If the host management component 139 does not obtain a command to install the hypervisor 149, the process can end, as shown.

If the host management component 139 obtains a command to install the hypervisor 149, the host management component 139, can move to step 606 and obtain an installation package for the hypervisor 149. In one example, the management service 113 can provide the installation package to the host management component 139. In another example, the management service 113 can specify the host management component 139 with the storage location for the installation package, and the host management component 139 can retrieve the installation package from the specified storage location.

After the host management component 139 has obtained the installation package, the host management component 139 can request the host operating system 136 to execute the installation package to install the hypervisor 149 in the virtual machine execution environment 143, as shown at step 609. Thereafter, the process can end.

Figure 7:
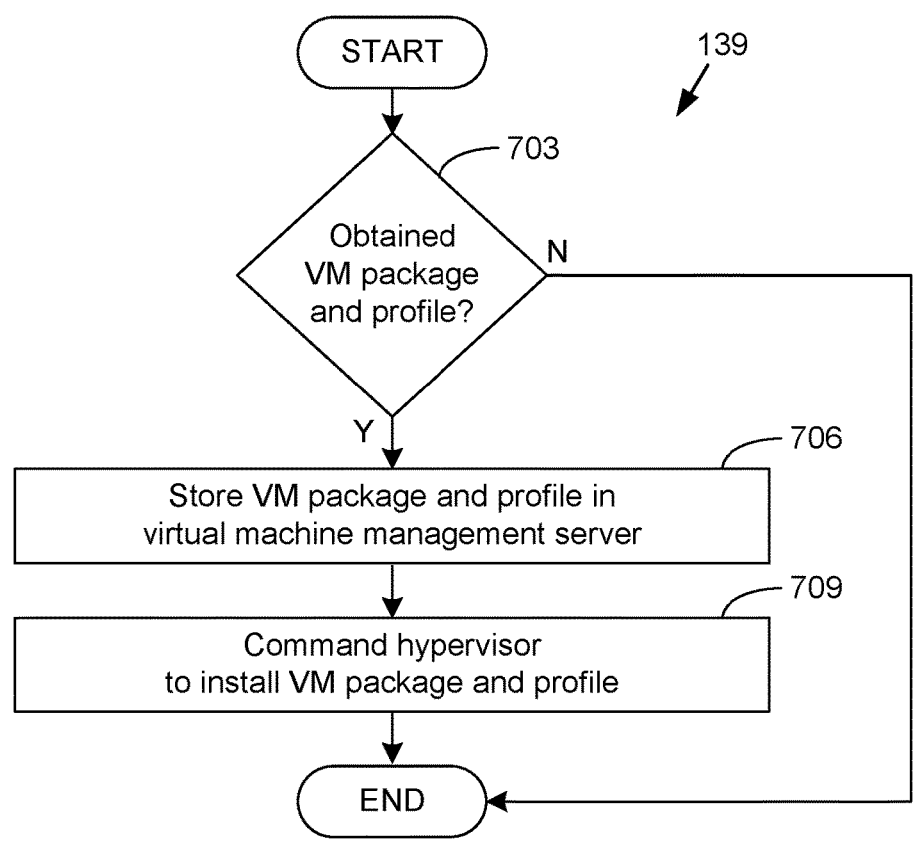

With reference to FIG. 7, shown is a flowchart that provides an example of another portion of the operation of the host management component 139. In particular, FIG. 7 provides an example of the host management component 139 causing the hypervisor 149 to install a virtual machine package 163 and a virtual machine profile 166. The flowchart of FIG. 7 can be viewed as depicting an example of a method implemented in the client device 106.

Beginning with step 703, the host management component 139 determine whether it obtained a virtual machine package 163 and a virtual machine profile 166. In some examples, the management service 113 can provide the virtual machine package 163 and the virtual machine profile 166 to the host management component 139 as a single package that the host management component 139 can extract. If the host management component 139 did not obtain a virtual machine package 163 and a virtual machine profile 166, the process can end, as shown.

If the host management component 139 did obtain a virtual machine package 163 and a virtual machine profile 166, the host management component 139 can store the virtual machine package 163 and the virtual machine profile 166 in the virtual machine management server 156, as indicated at step 706. In particular, the host management component 139 can store the virtual machine package 163 and the virtual machine profile 166 in the virtual machine management data store 159 of the virtual machine management server 156.

Then, the host management component 139 can command the hypervisor 149 to install the stored virtual machine package 163 and the virtual machine profile 166, as shown at step 709. In some examples, the command can include an IP address and a port number indicating that storage location from where the hypervisor 149 can retrieve the virtual machine package 163 and the virtual machine profile 166. Thereafter, the process can end.

Figure 8:
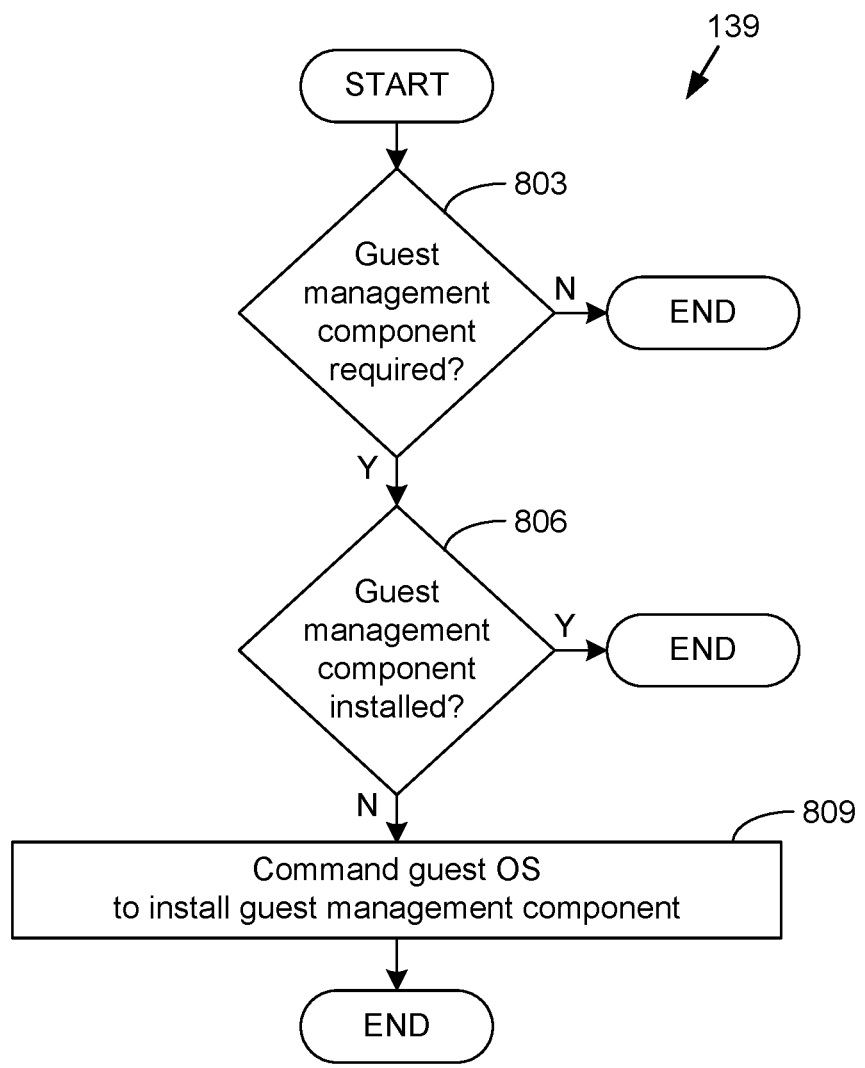

With reference to FIG. 8, shown is a flowchart that provides another example of a portion of the operation of the host management component 139. In particular, FIG. 8 provides an example of the host management component 139 causing the hypervisor 149 to install the guest management component 153. The flowchart of FIG. 8 can be viewed as depicting an example of a method implemented in the client device 106.

Beginning with step 803, host management component 139 can determine whether the guest management component 153 is required to be installed in the virtual machine 146. In some examples, the management service 113 can specify that the guest management component 153 is required. In other examples, the host management component 139 can identify that a compliance rule 126 specifies that the guest management component 153 is required.

If the guest management component 153 is not required, the process can end. Otherwise, if the guest management component 153 is required, the host management component 139 can determine whether the guest management component 153 is installed in the virtual machine 146, as shown at step 806. To this end, the host management component 139 can parse a data object that indicates which components are installed in the virtual machine 146.

If the guest management component 153 is already installed, the process can end. Otherwise, if the guest management component 153 is not installed, the host management component 139 can move to step 809 and command the guest operating system 151 to install the guest management component 153. In one example, the host management component 139 can provide the guest operating system 151 with an installation package for the guest management component 153 with an instruction to execute the installation package. In another example, the host management component 139 can command the guest management component 153 to obtain the installation package from a specified location. In some examples, the user can be prompted to accept terms of use and to agree to have the virtual machine 146 enrolled with the management service 113.

Figure 9:
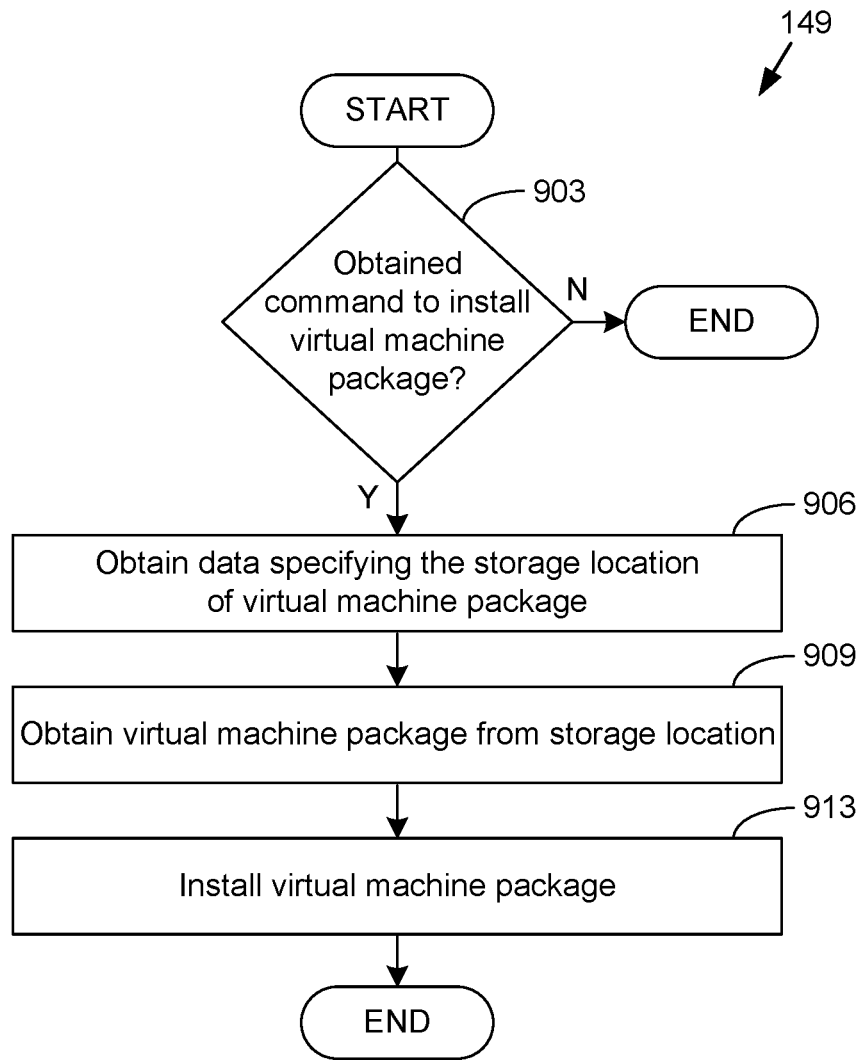
FIGS. 9-12 are flowcharts illustrating examples of functionality implemented by a hypervisor.

With reference to FIG. 9, shown is a flowchart that provides an example of a portion of the operation of the hypervisor 149. In particular, FIG. 9 provides an example of the hypervisor 149 installing a virtual machine 146. The flowchart of FIG. 9 can be viewed as depicting an example of a method implemented in the client device 106.

Beginning with step 903, the hypervisor 149 can determine whether it obtained a command to install a virtual machine package 163. For example, the hypervisor 149 can receive a command from the host management component 139 to install a virtual machine package 163. If the hypervisor 149 did not obtain a command to install the virtual machine package 163, the process can end.

Otherwise, if the hypervisor 149 did obtain a command to install the virtual machine package 163, the hypervisor 149 can obtain data specifying the storage location of the virtual machine package 163, as shown at step 906. In some examples, the host management component 139 can specify the storage location in the form of an IP address and port number.

At step 909, the hypervisor 149 can obtain the virtual machine package 163 from the specified location. Then, at step 913, the hypervisor 149 can install the virtual machine package 163 by, for example, installing or mounting a disk image if the virtual machine package 163 is a virtual machine image. As a result, the virtual machine 146 can be created in the virtual machine execution environment 143. Thereafter, the process can end.

Figure 10:
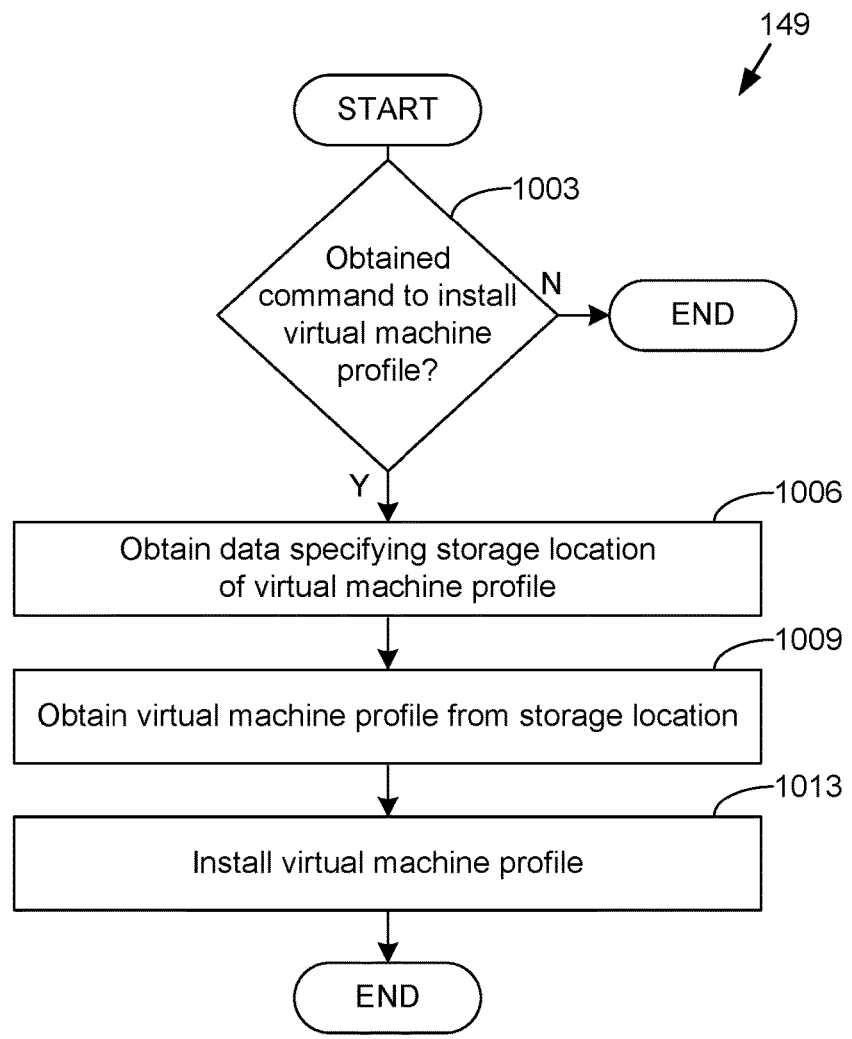

With reference to FIG. 10, shown is a flowchart that provides an example of another portion of the operation of the hypervisor 149. In particular, FIG. 10 provides an example of the hypervisor 149 installing a virtual machine profile 166. The flowchart of FIG. 10 can be viewed as depicting an example of a method implemented in the client device 106.

Beginning with step 1003, the hypervisor 149 can determine whether it obtained a command to install a virtual machine profile 166. For example, the hypervisor 149 can receive a command from the host management component 139 to install a virtual machine profile 166. If the hypervisor 149 did not obtain a command to install the virtual machine profile 166, the process can end.

Otherwise, if the hypervisor 149 did obtain a command to install the virtual machine profile 166, the hypervisor 149 can obtain data specifying the storage location of the virtual machine profile 166, as shown at step 1006. In some examples, the host management component 139 can specify the storage location in the form of an IP address and port number.

At step 1009, the hypervisor 149 can obtain the virtual machine profile 166 from the specified location. Then, at step 1013, the hypervisor 149 can install the virtual machine profile 166. Thereafter, the process can end.

Figure 11:
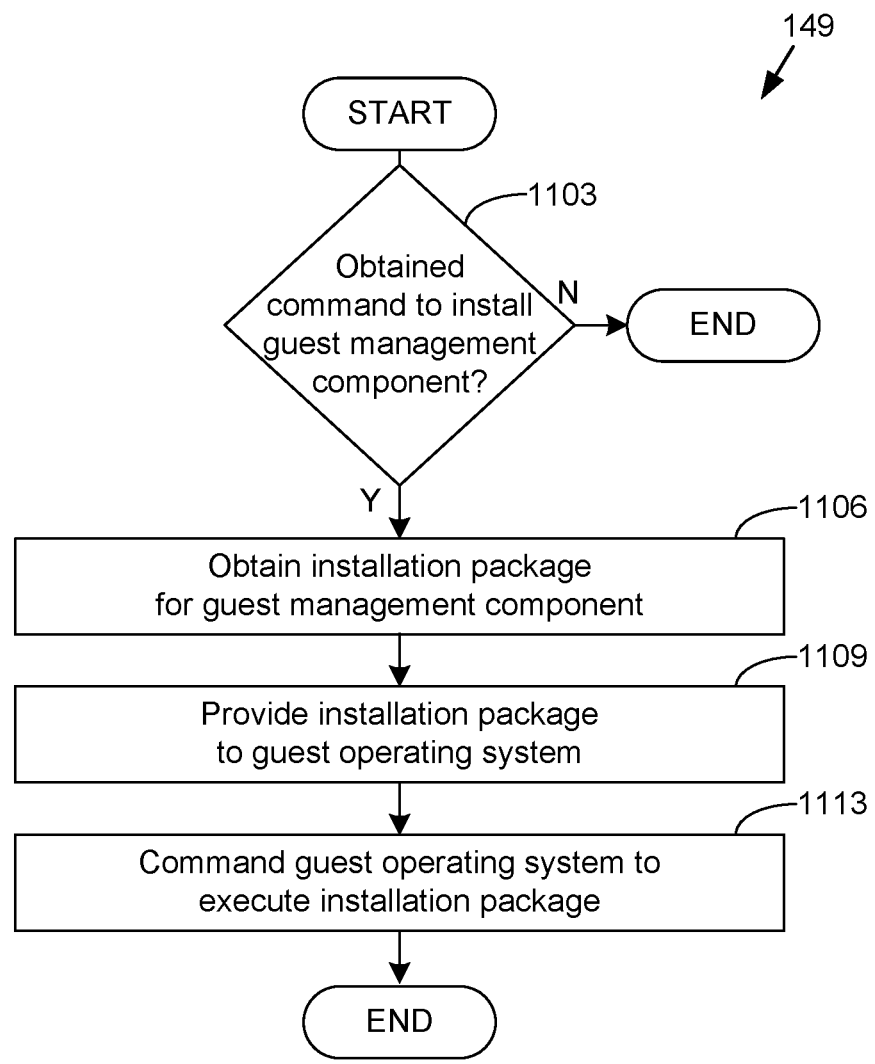

With reference to FIG. 11, shown is a flowchart that provides an example of another portion of the operation of the hypervisor 149. In particular, FIG. 11 provides an example of the hypervisor 149 installing the guest management component 153 in the virtual machine 146. The flowchart of FIG. 11 can be viewed as depicting an example of a method implemented in the client device 106.

Beginning with step 1103, the hypervisor 149 can determine whether it obtained a command to install the guest management component 153. For example, the hypervisor 149 can receive a command from the host management component 139 to install the guest management component 153. If the hypervisor 149 did not obtain a command to install the guest management component 153, the process can end.

At step 1106, the hypervisor 149 can obtain an installation package for the guest management component 153. In some examples, the host management component 139 can provide the installation package. In other examples, the guest management component 153 can obtain data specifying the storage location of the installation package, and the guest management component 153 can retrieve the installation package from the storage location.

As shown at step 1109, the hypervisor 149 can provide the installation package to the guest operating system 151. Then, at step 1113, the hypervisor 149 can command the guest operating system 151 to execute the installation package for the guest management component 153. Thereafter, the process can end.

Figure 12:
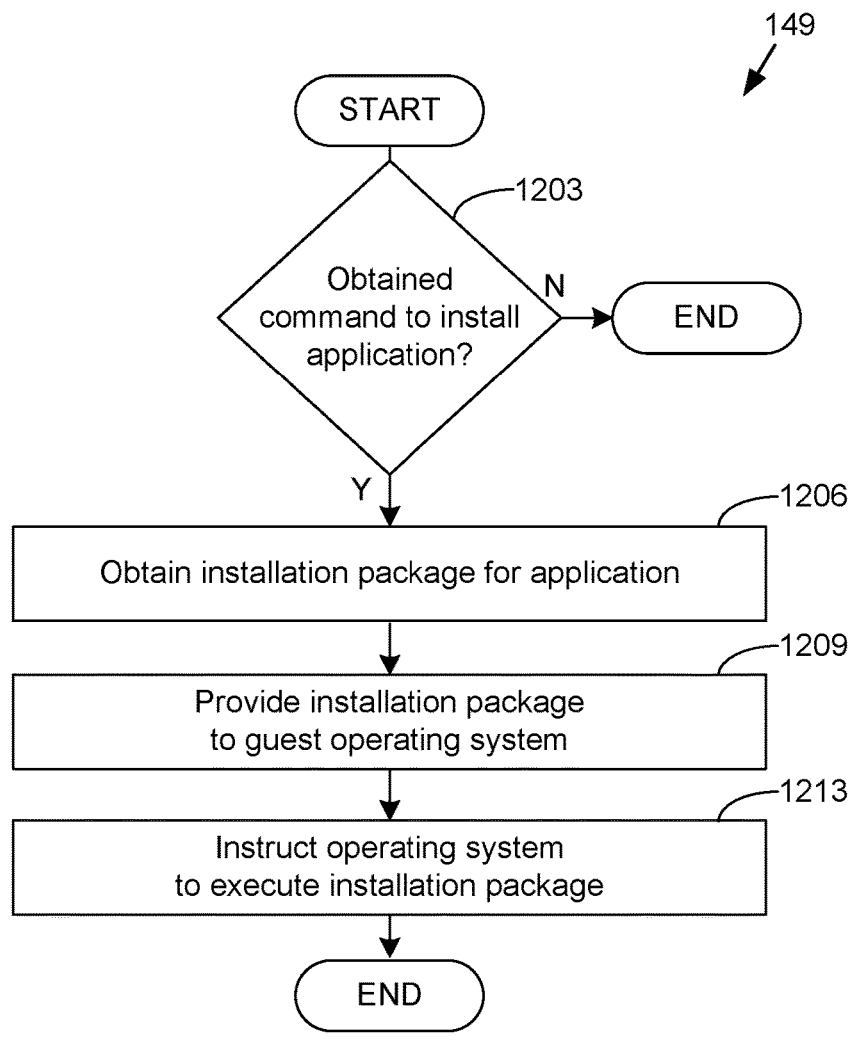

With reference to FIG. 12, shown is a flowchart that provides an example of another portion of the operation of the hypervisor 149. In particular, FIG. 12 provides an example of the hypervisor 149 installing an application in the virtual machine 146. The flowchart of FIG. 12 can be viewed as depicting an example of a method implemented in the client device 106.

Beginning with step 1203, the hypervisor 149 can determine whether it obtained a command to install an application. For example, the hypervisor 149 can receive a command from the host management component 139 to install an application for which the user of the client device 106 has requested access. If the hypervisor 149 did not obtain a command to install the application, the process can end.

At step 1206, the hypervisor 149 can obtain an installation package for the application. In some examples, the host management component 139 can provide the installation package. In other examples, the guest management component 153 can obtain data specifying the storage location of the installation package, and the guest management component 153 can retrieve the installation package from the storage location.

As shown at step 1209, the hypervisor 149 can provide the installation package to the guest operating system 151. Then, at step 1213, the hypervisor 149 can command the guest operating system 151 to execute the installation package for the application. Thereafter, the process can end.

The sequence diagrams and flowcharts discussed above show examples of the functionality and operation of implementations of components described herein. The components of the networked environment 100 described herein can be embodied in hardware, software, or a combination of hardware and software. If embodied in software, each step in the sequence diagrams and flowcharts can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the sequence diagrams and flowcharts discussed above show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The enterprise computing environment 103 and client device 106 can include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, at least portions of the management service 113, the directory service 116, the host operating system 136, the host management component 139, and the hypervisor 149 can be stored in one or more storage devices and be executable by one or more processors. Also, the enterprise data store 119 can be located in the one or more storage devices.

Components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software and computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A method, comprising:
    obtaining a request to access an application on behalf of a user, the request being obtained from a client device associated with the user;
    determining that the client device is required to execute a virtual machine for the application based at least in part on a compliance rule or a comparison of a plurality of compatible operating systems for the application with a host operating system being executed on the client device;
    identifying that the virtual machine is not installed in the client device;
    determining that a hypervisor associated with the client device is authorized to install the virtual machine;
    causing the virtual machine to be installed in the client device by instructing the hypervisor to retrieve a virtual machine package associated with the virtual machine;
    generating a virtual machine profile for the virtual machine, the virtual machine profile comprising at least one hardware restriction for the virtual machine according to a compliance rule assigned to the client device, the at least one hardware restriction prohibiting the virtual machine from accessing a storage device attached to the client device; and
    installing the virtual machine profile in the client device, wherein installing the virtual machine profile enforces the at least one hardware restriction on the client device.

2. The method of claim 1, further comprising causing a guest management component to be installed in the virtual machine.

3. The method of claim 2, wherein causing the guest management component to be installed in the virtual machine comprises commanding a guest operating system for the virtual machine to install the guest management component in the virtual machine.

4. The method of claim 3, further comprising providing an installation package for the guest management component.

5. The method of claim 3, further comprising:
    providing a storage location of an installation package for the guest management component, the storage location comprising an IP address and a port number; and
    providing a command to retrieve the installation package for the guest management component from the storage location.

6. The method of claim 1, further comprising commanding the hypervisor for the virtual machine to execute in a mode that hides a console for the virtual machine when executing the application.

7. The method of claim 1, wherein determining that the hypervisor is authorized to install the virtual machine by determining that a name and a version of the hypervisor is compatible with the virtual machine.

8. The method of claim 7, wherein the name and the version of the hypervisor are determined by accessing a data object stored in a memory of the client device, the data object describing a plurality of components installed in the client device.

9. The method of claim 1, further comprising instructing the hypervisor to install a virtual machine profile that configures the hypervisor to delete the virtual machine at specified time.

10. The method of claim 1, further comprising causing the virtual machine to terminate in the client device on an expiration date specified in the virtual machine profile.

11. A system, comprising:
    a computing device;
    a storage device storing a plurality of computer instructions executable by the computing device, wherein the plurality of computer instructions cause the computing device to at least:
        obtain a request to access an application on behalf of a user, the request being obtained from a client device associated with the user;
        determine that the client device is required to execute a virtual machine that executes the application based at least in part on a compliance rule or a comparison of a plurality of compatible operating systems for the application with a host operating system being executed on the client device, the compliance rule indicating that a particular user of the client device is required to execute the virtual machine with the application;
        identify that the virtual machine is not installed in the client device;
        determine that a hypervisor associated with the client device is authorized to install the virtual machine;
        cause the virtual machine to be installed in the client device by instructing the hypervisor to retrieve a virtual machine package associated with the virtual machine;
        generate a virtual machine profile for the virtual machine, the virtual machine profile comprising at least one hardware restriction for the virtual machine according to a compliance rule assigned to the client device the at least one hardware restriction prohibiting the virtual machine from accessing a storage device attached to the client device; and
        install the virtual machine profile in the client device, wherein installing the virtual machine profile enforces the at least one hardware restriction on the client device.

12. The system of claim 11, wherein the plurality of computer instructions further cause the computing device to at least cause a guest management component to be installed in the virtual machine.

13. The system of claim 12, wherein the plurality of computer instructions further cause the computing device to at least provide a command to install the guest management component in the virtual machine.

14. The system of claim 13, wherein the plurality of computer instructions further cause the computing device to at least provide an installation package for the guest management component.

15. The system of claim 13, wherein the plurality of computer instructions further cause the computing device to at least:
provide a storage location of an installation package for the guest management component; and
provide a command to retrieve the installation package for the guest management component from the storage location, the storage location comprising an IP address and a port number.

16. The system of claim 11, wherein the plurality of computer instructions further cause the computing device to at least command the hypervisor for the virtual machine to execute in a mode that hides a console for the virtual machine when executing the application.

17. A non-transitory computer-readable medium storing a plurality of computer instructions executable by a computing device, wherein the plurality of computer instructions cause the computing device to at least:
obtain a request to access an application on behalf of a user, the request being obtained from a client device associated with the user;
determine that the client device is required to execute a virtual machine that executes the application based at least in part on a compliance rule or a comparison of a plurality of compatible operating systems for the application with a host operating system being executed on the client device, the compliance rule indicating that a particular user of the client device is required to execute the virtual machine with the application;
identify that the virtual machine is not installed in the client device;
determine that a hypervisor associated with the client device is authorized to install the virtual machine;
cause the virtual machine to be installed in the client device by instructing the hypervisor to retrieve a virtual machine package associated with the virtual machine,
generate a virtual machine profile for the virtual machine, the virtual machine profile comprising at least one hardware restriction for the virtual machine according to a compliance rule assigned to the client device, the at least one hardware restriction prohibiting the virtual machine from accessing a storage device attached to the client device; and
install the virtual machine profile in the client device, wherein installing the virtual machine profile enforces the at least one hardware restriction in the client device.

18. The non-transitory computer-readable medium of claim 17, wherein the plurality of computer instructions further cause the computing device to at least cause a guest management component to be installed in the virtual machine.

19. The non-transitory computer-readable medium of claim 18, wherein the plurality of computer instructions further cause the computing device to at least provide a command to install the guest management component in the virtual machine.

20. The non-transitory computer-readable medium of claim 19, wherein the plurality of computer instructions further cause the computing device to at least:
provide a storage location of an installation package for the guest management component; and
provide a command to retrieve the installation package for the guest management component from the storage location.

* * * * *